(12) United States Patent
Woo

(10) Patent No.: US 11,037,088 B1
(45) Date of Patent: Jun. 15, 2021

(54) SYSTEMS AND METHODS FOR SELLER CATEGORY DETERMINATION AND PROVIDING TAILORED FULFILLMENT MANAGEMENT SERVICES

(71) Applicant: Auctane, LLC, Austin, TX (US)

(72) Inventor: Edwin Gar-Ho Woo, Austin, TX (US)

(73) Assignee: Auctane, LLC, Austin, TX (US)

( * ) Notice: Subject to any disclaimer, the term of this patent is extended or adjusted under 35 U.S.C. 154(b) by 615 days.

(21) Appl. No.: 15/873,499

(22) Filed: Jan. 17, 2018

(51) Int. Cl.
*G06Q 30/02* (2012.01)
*G06Q 50/28* (2012.01)
*G06Q 10/08* (2012.01)

(52) U.S. Cl.
CPC ......... *G06Q 10/083* (2013.01); *G06Q 10/087* (2013.01); *G06Q 30/02* (2013.01); *G06Q 50/28* (2013.01)

(58) Field of Classification Search
CPC ...... G06Q 10/00; G06Q 40/00; G06Q 10/083; G06Q 10/087; G06Q 30/02; G06Q 50/28
USPC ....................................................... 705/7.25
See application file for complete search history.

(56) References Cited

U.S. PATENT DOCUMENTS

| | | | | |
|---|---|---|---|---|
| 7,848,953 | B2 * | 12/2010 | Kahlon .................. | G06Q 10/08 705/22 |
| 9,305,281 | B2 * | 4/2016 | Waddington ..... | G06Q 10/08355 |
| 9,779,375 | B2 * | 10/2017 | Grabovski ....... | G06Q 10/06311 |
| 9,830,328 | B2 * | 11/2017 | Faith .................... | G06F 16/164 |
| 10,262,001 | B2 * | 4/2019 | Faith .................... | G06F 16/245 |
| 2003/0065574 | A1 * | 4/2003 | Lawrence .............. | G06Q 30/06 705/26.82 |
| 2005/0256787 | A1 * | 11/2005 | Wadawadigi ...... | G06Q 30/0601 705/28 |
| 2008/0119949 | A1 * | 5/2008 | Gile ....................... | G06Q 10/08 700/28 |
| 2010/0257015 | A1 * | 10/2010 | Molander .......... | G06Q 10/1097 705/7.21 |

OTHER PUBLICATIONS

PR Web "Order Fulfillment Services in the US Industry Market Research Report from IBISWorld Has Been Updated", 2014, Online Visibility from Vocus, pp. 1-3. (Year: 2014).*

* cited by examiner

*Primary Examiner* — Romain Jeanty
(74) *Attorney, Agent, or Firm* — Norton Rose Fulbright US LLP

(57) ABSTRACT

Systems and methods which provide for determining seller categorization information using various information available in and to a shipping management system and for applying the seller categorization information to the operation of the shipping management system to provide fulfillment management services tailored for the seller are described. A feature set optimization engine of embodiments may implement various rules for inferentially determining one or more categories/subcategories for sellers using information that is not directly seller industry or product category information but which is otherwise utilized and available for shipping management functionality of a shipping management system. The feature set optimization engine may intelligently apply the inferentially determined seller categorization information with respect to one or more features of the shipping management system using various rules to implement an appropriate fulfillment management feature set.

25 Claims, 2 Drawing Sheets

SYSTEMS AND METHODS FOR SELLER CATEGORY DETERMINATION AND PROVIDING TAILORED FULFILLMENT MANAGEMENT SERVICES

TECHNICAL FIELD

The present invention relates generally to order fulfillment management and, more particularly, to determining seller categorization information and applying the information to provide fulfillment management services tailored for the seller.

BACKGROUND OF THE INVENTION

In today's world of electronic commerce and widespread marketing via the Internet, an ever increasing amount of goods are being purchased online for shipping from sellers or other providers to buyers, consumers, or other acquirers. Such sellers include large enterprises in the business of mass marketing of goods, such as Amazon.com, Inc., Best Buy Co., Inc., Overstock.com, Inc., etc., as well as smaller enterprises and individuals, such as small businesses, sole proprietorships, and even individuals as may market goods via their own web sites or through communal marketing web sites (e.g., eBay.com, Amazon's Marketplace, Etsy, etc.).

Various shipping management systems have been developed for use in managing the fulfillment of orders and shipment of items by such sellers. For example, shipping management systems, such as the SHIPSTATION shipping management system provided by Auctane LLC of Austin Tex., provide functionality for the management of item orders, managing the picking and packing of items for order fulfilment, generation of invoices, packing slips, manifests, shipping labels, and postage or other prepaid shipping indicia, and tracking of shipment of items through a shipping service provider. Such shipping management systems may interface with shipper systems, shipping service provider systems, etc., such as though the use of a shipping service provider application programming interface (API), in order to facilitate the foregoing functionality.

Such shipping management systems provide an appreciable level of automation and functionality with respect to seller's order fulfillment and item shipment workflows. However, the variety of sellers, including sellers of disparate sizes, industries, products, etc., necessitates accommodation of a large range of features and options by the shipping management systems in order to accommodate as many sellers as possible. Although a shipping management system provider may include settings for allowing a seller to selectively enable various desired features and options, often the implementation of such settings requires the seller to answer an appreciable number of questions and/or make an appreciable number of selections. Sellers, particularly the smaller less sophisticated ones that are often the largest in number of those using a shipping management system platform, frequently are unwilling to devote adequate time to thoroughly completing a robust setup process and/or do not have sufficient information or a clear understanding of the available options to optimize the shipping management system setup and/or operation for their use. Accordingly, sellers are sometimes left with shipping management system operation that is suboptimal for their particular situation, despite the availability of features and options that could better serve their needs.

BRIEF SUMMARY OF THE INVENTION

The present invention is directed to systems and methods which provide for determining seller categorization information using various information available in and to a shipping management system and for applying the seller categorization information to the operation of the shipping management system to provide fulfillment management services tailored for the seller. For example, a feature set optimization engine of embodiments may implement various rules for inferentially determining one or more categories and/or subcategories for sellers using information that is not directly seller industry or product category information but which is otherwise utilized and available for shipping management functionality of a shipping management system, such as item description information, seller inventory information, shipping media information (e.g., postage indicia generation information, shipping label generation information, shipping box and container sizes, packing materials used, etc.), shipping service information (e.g., shipping service provider information, shipping services information, etc.), and/or the like. The feature set optimization engine preferably intelligently applies the inferentially determined seller categorization information with respect to one or more features of the shipping management system using various rules to implement a fulfillment management feature set, such as may control available functionality, options, interfaces, operations, workflows, etc. of the shipping management system, tailoring fulfillment management services to the seller. In intelligently applying inferentially determined seller categorization information, a feature set optimization engine of embodiments may operate to perform processing for confirming a seller category prior to tailoring fulfilment management services to the seller for a particular seller category and/or subcategory. For example, a feature set optimization engine may use various rules to analyze peripheral information, such as marketplaces the seller is active in, information regarding recipients of seller's goods, etc., to determine a level of confidence with respect to inferentially determined seller categorization information prior to its application in tailoring fulfilment management services for the seller.

The rules utilized by a feature set optimization engine of embodiments of the invention may include rules for determining seller categorization information, rules for determining a level of confidence with respect to determined seller categorization information, and rules for applying determined seller categorization information in configuring features and options of a shipping management system. For example, embodiments of a feature set optimization engine implement a rules based engine for analyzing various information associated with a seller, such as the seller's behaviors with respect to item sales and fulfilment, the seller's sale listings, the seller's shipments, the seller's recipients, etc., to determine seller categorization information. Rules for determining seller categorization information implemented by a feature set optimization engine of embodiments may operate to correlate various information associated with a seller with that of other sellers and/or category/subcategory designations to determine intermediate or putative seller categorization information for that seller. Embodiments of a feature set optimization engine further implement a rules based engine for analyzing putative seller categorization information to provide a level of confidence to determine whether putative seller categorization information is to be applied to tailor a fulfillment management feature set for the seller. Rules for determining whether to tailor a fulfillment management feature set for the seller using putative seller categorization information may operate to analyze peripheral information (e.g., information that is available to the shipping management system other than that used in determining the putative seller categorization information) to determine a level of confidence metric and compare the level of confidence metric to a confidence threshold (e.g., determine if the intermediate or putative seller categorization information is to be used as the final or determined seller categorization information). In operation of some implementations of the rules for determining whether to tailor a fulfillment management feature set for the seller using putative seller categorization information, the level of confidence metric and the confidence threshold may be used to either provide further application of the rules for determining seller categorization information to refine the seller categorization information or to proceed to application of rules for applying the determined seller categorization information with respect to one or more features of the shipping management system. Accordingly, embodiments of a feature set optimization engine further implement a rules based engine for implementing a fulfillment management feature set optimized or otherwise tailored to the seller in accordance with the seller categorization information determined with respect to the seller. Rules for implementing a tailored fulfillment management feature set may operate to select, selectively activate, implement, alter, etc. functionality, options, interfaces, operations, workflows, etc. of the shipping management system based upon the seller categorization information determined for the seller.

Tailoring of a fulfilment management feature set for a seller based upon determined seller categorization information may include configuring various aspects of the shipping management system, providing particular information to the seller, implementing optional features and functions, and/or the like. For example, embodiments of the present invention may operate to alter a shipping management system user interface used by the seller based upon the determined seller categorization information. Additionally or alternatively, embodiments may provide recommendations regarding packaging, shipping service providers, and/or shipping services for use in fulfilling shipments based upon the determined seller categorization information. Likewise, embodiments may additionally or alternatively provide recommendations regarding additional marketplaces, goods, services, etc. the seller should consider based upon the determined seller categorization information.

It should be appreciated that determining seller categorization information using various information available in and to a shipping management system in operation according to embodiments of the present invention may result in seller categorization that is different than that of how a seller may categorize themselves. However, in light of the seller categorization information determined according to embodiments herein being based upon shipping management system information that is indicative of and associated with the seller's fulfillment activities and behaviors, possibly using information not otherwise available to individual sellers, application of such determined seller categorization in the operation of the shipping management system to provide fulfillment management services nevertheless accurately tailors fulfilment management services for the seller. Accordingly, a seller may be provided with a fulfillment management feature set that is better suited for the seller's use of the shipping management system than would result from the seller's direct active manipulation of a feature set.

As can be appreciated from the foregoing, in operation according to embodiments of the invention sellers may enjoy shipping management system operation that is optimized for their particular situation, even in situations where a seller is unwilling to devote adequate time to thoroughly completing a robust setup process and/or does not have sufficient information or a clear understanding of the available options to optimize the shipping management system setup for their use. Moreover, seller categorization information determination and associated tailoring of fulfillment management services may be performed dynamically, such as by operation of embodiments of a feature set optimization engine, to facilitate shipping management system operation that is optimized to the seller's use even where the seller's business transforms over time and/or where applicability of one or more features or options to the seller otherwise changes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
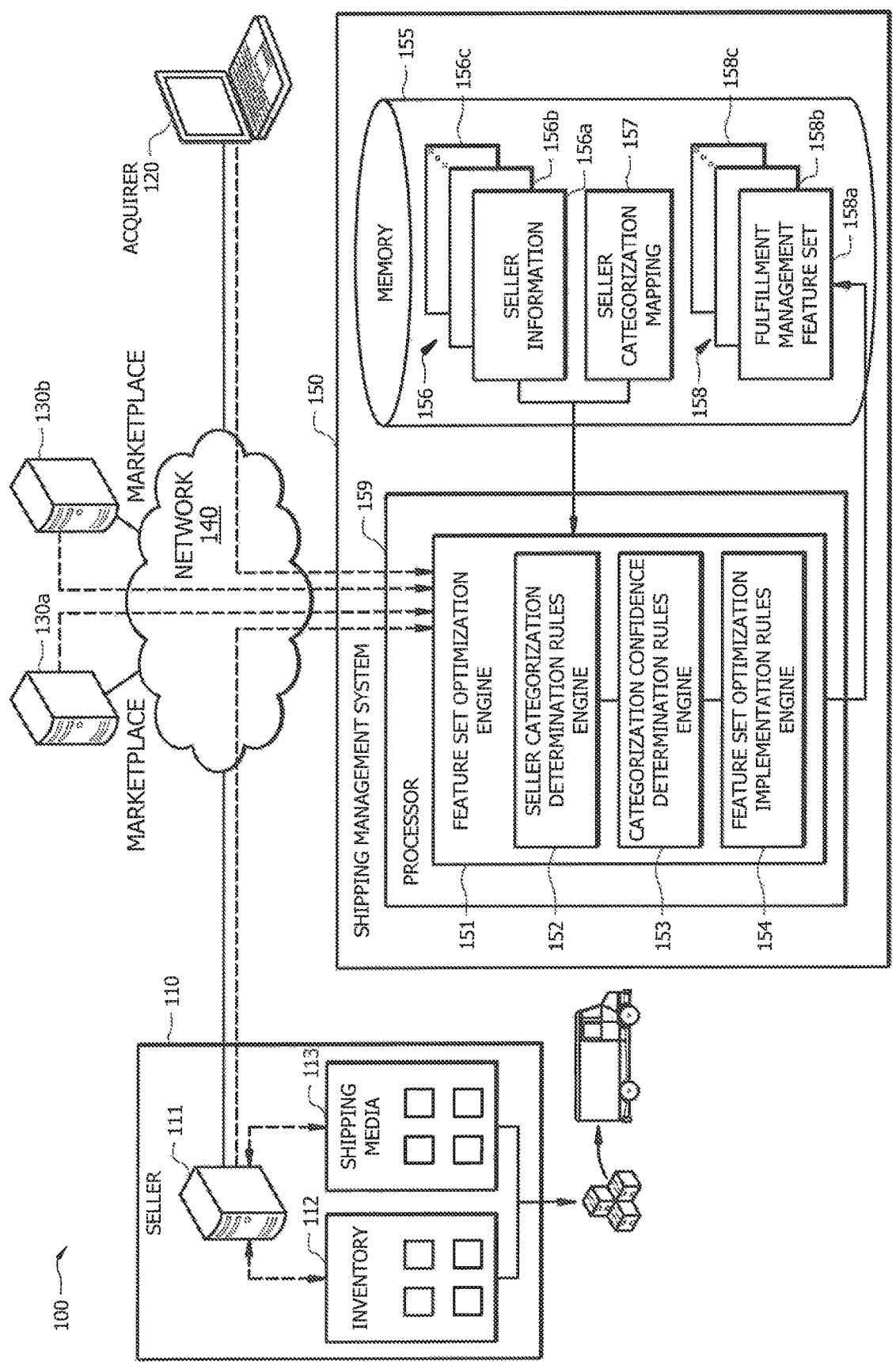
FIG. 1 shows an embodiment of a system configured to determine seller categorization information and apply the seller categorization information to provide operation of a shipping management system tailored for the seller according to concepts of the present invention.

FIG. 1 shows an embodiment of system 100 configured according to concepts of the present invention. In particular, system 100 of the illustrated embodiment is operable to provide for determining seller categorization information and for applying the seller categorization information to provide operation, such as fulfillment management services, tailored for the seller.

System 100 of the illustrated embodiment comprises seller system 111, acquirer system 120, marketplace systems 130a-130b, and shipping management system 150 coupled to network 140. Seller system 111, acquirer system 120, marketplace systems 130a-130b, and shipping management system 150 of embodiments comprise processor-based systems (e.g., one or more computers, workstations, kiosk terminals, portable processor-based devices, servers, etc.)

operable under control of one or more instructions sets (e.g., software, firmware, applet, etc. stored in memory) to perform operations and functionality in accordance with the concepts herein. It should be appreciated that, although a single instance of a seller system, acquirer system, and shipping management system and two instances of marketplace systems are shown for simplicity, any number of such systems may be accommodated in various embodiments of a system providing for determining seller categorization information and for applying the seller categorization information to provide operation, such as fulfillment management services, tailored for the seller according to the concepts herein.

Seller system 111 of embodiments may, for example, comprise a processor-based system (e.g., computer workstation, server system, etc.) operable in association with a seller of goods (e.g., online retailer, wholesaler, individual offering items for sale, etc.) to perform functions such as inventory management, advertisement and sales listing placement, order processing and fulfillment, and reporting. Accordingly, seller system 111 may operate in cooperation with an appropriate one or more of acquirer system 120 marketplace systems 130a-130b, and shipping management system 150, such as via network 140, in performing particular aspects of the foregoing functionality.

Acquirer system 120 of embodiments may, for example, comprise a processor-based system (e.g., one or more user devices in the form computers, workstations, kiosk terminals, portable processor-based devices, etc.) facilitating a purchaser's (e.g., business establishment, individual, reseller, etc.) acquisition of various goods or other items from sellers, facilitating payment to sellers for acquired items, reporting tracking information for items being acquired, and processing returns of items when appropriate. Accordingly, acquirer system 120 may operate in cooperation with an appropriate one or more of seller system 111, marketplace systems 130a-130b, and shipping management system 150, such as via network 140, in performing particular aspects of the foregoing functionality.

Marketplace systems 130a-130b may, for example, each comprise a processor-based system (e.g., computer workstation, server system, etc.) operable in association with a marketplace provider (e.g., online marketplace host, auction site host, sale listing aggregator, etc.) facilitating an interface between sellers and acquirers of goods or other items for the sale and acquisition of such items. Accordingly, each of marketplace systems 130a-130b may operate in cooperation with an appropriate one or more of seller system 111, acquirer system 120, and shipping management system 150, such as via network 140, in performing particular aspects of the foregoing functionality.

Network 140 of the illustrated embodiment provides communication links facilitating communication between various systems and components of system 100, such as seller system 111 and any or all of acquirer system 120, marketplace systems 130a-130b, and shipping management system 150, acquirer system 120 and marketplace systems 130a-130b, and marketplace systems 130a-130b and shipping management system 150. Accordingly, network 140 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

Shipping management system 150 may, for example, comprise a processor-based system (e.g., one or more computer workstation, server system, etc.) operable to provide management functionality with respect to item fulfillment by one or more sellers. As an example, shipping management system 150 may comprise a shipping management system operable to provide the automation of tasks associated with the shipment of items, including the management of item orders, managing the picking and packing of items for order fulfilment, generation of invoices, packing slips, manifests, shipping labels, and postage or other prepaid shipping indicia, and/or tracking of shipment of items through a shipping service provider. In accordance with embodiments of the invention, shipping management system 150 provides a multi-carrier shipping management system capable of providing various shipping functionality (e.g., rating, shipping indicia generation, packing list printing, shipping label printing, tracking, carrier pickup request, manifest printing, account management and payment, etc.) for a plurality of shipping service providers (e.g., the USPS, UPS, FedEx, DHL, local couriers, etc.). Accordingly, shipping management system 150 may operate in cooperation with an appropriate one or more of seller system 111, acquirer system 120, and marketplace systems 130a-130b, such as via network 140, in performing particular aspects of the foregoing functionality.

It should be appreciated that shipping management system 150 of embodiments may comprise a cloud-based deployment of an application which is stored and executed by processor-based computing equipment disposed in the "cloud" of network 140. Accordingly, shipping management system 150 may comprise computer executable code executing on one or more processor-based systems (e.g., web servers) deployed in network 140. Shipping management system 150 may, for example, comprise a system providing various desired functionality such as in the form of software as a service (SaaS), infrastructure as a service (IaaS), platform as a service (PaaS), unified communications as a service (UCaaS), etc.

In exemplary operation of system 100 illustrated in FIG. 1, seller 110 may offer various items for sale to purchasers or acquirers of goods, such as an acquirer associated with acquirer system 120. For example, seller 110 may use seller system 111 to list items of inventory 112 for sale in one or more online marketplaces (e.g., Amazon Marketplace, eBay, Etsy, Craigslist, etc.), such as may be provided by one or more of marketplace systems 130a-130b. An acquirer of such items may utilize acquirer system 120 to interface with one or more of marketplace systems 130a-130b to purchase a selection of such items, requesting shipment thereof. In operation according to embodiments, shipping management system 150 may obtain information regarding the listing and sale of such items, such as from seller system 111 and/or an appropriate one of marketplace systems 130a-130b, for providing management services with respect thereto to seller 110. Accordingly, seller system 111 may utilize information provided by shipping management system 150 in managing orders of items, processing fulfillment of the orders, generating or otherwise preparing shipping media (e.g., shipping media 113, such as may comprise packaging, postage indicia, shipping labels, etc.), tracking shipment status, and reporting to the seller and/or acquirer.

Accordingly, sellers (e.g., seller 110) using shipping management system 150 may provide various information regarding their items and operations to the shipping management system or otherwise for use by the shipping management system. For example, sellers may provide descriptions of items (e.g., textual description, stock keeping unit (SKU) identification code, universal product code (UPC)

information, item identification number, item size, item weight, etc. for inventory 112) they offer for sale, inventory information (e.g., quantity, location, etc.), shipping media information (e.g., postage indicia generation information, shipping label generation information, shipping box and container sizes, packing materials used, packing list information, duty and/or tariff form information, etc. of shipping media 113), shipping service information (e.g., shipping service providers such as the USPS, UPS, FedEx, DHL, local couriers, etc. used by the seller, shipping services such as first class mail, overnight delivery, two-day delivery, return receipt requested, signature required, insured parcel, etc. used by the seller, shipping rates, etc.), and/or the like for use by shipping management system 150. For example, seller 110 may provide some or all of the foregoing seller information to shipping management system 150 through an initial setup process. Additionally or alternatively, seller 110 may provide some or all of the foregoing seller information to shipping management system 150 through shipping management operation, such as in association with the sale of various items and associated order fulfillment. Shipping management system 150 may additionally or alternatively obtain some or all of the foregoing seller information from one or more systems, such as from seller system 111 (e.g., from inventory, accounting, database, or similar systems thereof) and/or from one or more of marketplace systems 130a and 130b (e.g., from item listing, accounting, database, or similar systems thereof).

Irrespective of the way in which such seller is provided to or obtained by shipping management system 150, seller information for each seller using shipping management system 150 is preferably stored in a memory thereof. For example, seller information for seller 110 may be stored in seller information database 156 of memory 155, such as may include seller information 156a associated with seller 110, seller information 156b associated with another seller (not shown), seller information 156c associated with yet another seller (also not shown), and so on.

Shipping management system 150 of embodiments provides a robust shipping management functionality to accommodate a variety of sellers, items, acquirers, shipping services, etc. For example, shipping management system 150 may provide numerous features applicable to various of such sellers, items, acquirers, shipping services, etc. for automation of tasks associated with the shipment of items (e.g., management of item orders, managing the picking and packing of items for order fulfilment, generation of invoices, packing slips, manifests, shipping labels, and postage or other prepaid shipping indicia, and/or tracking of shipment of items through a shipping service provider). The availability of such robust and varied feature sets may, however, present a challenge to the users (e.g., seller 110) of shipping management system 150 in understating the relevance of particular features to their operations, appreciating the optional features available to them, selecting and configuring particular features for their use, etc. Accordingly, shipping management system 150 is configured to intelligently provide fulfillment management services tailored for the seller. For example, shipping management system 150 of embodiments is operable to tailor a fulfillment management feature set of the shipping management system for one or more attribute of the seller, seller's operation, items sold by the seller, etc., using automated feature set optimization (e.g., without requiring a seller to provide, specifically or directly for tailoring the feature set, some or all information used for determining particular features, options, and settings).

Shipping management system 150 of the embodiment illustrated in FIG. 1 includes feature set optimization engine 151 configured to intelligently provide fulfillment management services tailored for the seller. Feature set optimization engine 151 of embodiments may, for example, comprise a rules based engine (e.g., implemented as one or more instructions sets executed by processor 159) configured for inferentially determining one or more categories and/or subcategories for sellers using information that is not directly seller industry or product category information but which is otherwise utilized and available for shipping management functionality of shipping management system 150. For example, feature set optimization engine 151 may utilize various information of seller information database 156 (e.g., particular information from seller information 156a for seller 110) and/or seller information available from one or more of seller system 111, acquirer system 120, and marketplace systems 130a-130b, such as item description information (e.g., textual description, SKU identification code, UPC information, item identification number, item size, item weight, etc.), inventory information (e.g., quantity, location, etc.), shipping media information (e.g., postage indicia generation information, shipping label generation information, shipping box and container sizes, packing materials used, packing list information, duty and/or tariff form information, etc.), shipping service information (e.g., shipping service provider information, shipping services information, etc.), and/or the like for determining seller categorization information (e.g., one or more seller category and/or subcategory) for the seller.

Feature set optimization engine 151 of embodiments may use information in addition to the aforementioned seller information in determining seller categorization information for a particular seller. For example, shipping management system 150 of the illustrated embodiment includes seller categorization mapping database 157 providing seller categorization mapping information as may be used in combination with the aforementioned seller information by feature set optimization engine 151 in determining one or more intermediate or putative seller category and/or subcategory for sellers. Seller categorization mapping database 157 may comprise information mapping particular attributes of seller information to seller categories and/or subcategories for which fulfilment management feature set optimization is provided. For example, seller categorization mapping database 157 may include one or more tables providing mapping between particular instances of seller information and/or information derived therefrom to corresponding seller categories and/or subcategories. Such categorization mapping information may be initially provided by an administrator or other personnel associated with shipping management system 150, such as at a time of deployment and/or throughout operation of the system. Additionally or alternatively, seller categorization mapping information of seller categorization mapping database 157 may be derived by logic of shipping management system 150, such as by analyzing seller information of various sellers and associating those features with seller categories and/or subcategories. For example, logic of shipping management system 150 may implement term frequency-inverse document frequency (TFIDF) analysis techniques with respect to a seller's information (e.g., products, sales history, market places, customers, suppliers, shipping methods, etc.) to identify particular terms potentially relevant to the seller's category and identify commonalities with respect to a system-wide base of sellers for determining seller categorization mapping information (e.g., clustering sellers having a similar set of common identified terms).

It should be appreciated that the particular categories and subcategories of the seller categorization mapping information in embodiments of seller categorization mapping database 157 may or may not themselves be informative of the seller categories/subcategories represented. Whether the categories and subcategories of seller categorization mapping information is itself informative of the particular seller categories/subcategories represented, the categories and subcategories of embodiments herein nevertheless facilitate relevant grouping of sellers (e.g., similarly situated sellers, sellers of similar operations, sellers likely to employ the same or similar features and options of the shipping management system, and the like) based upon seller information.

In example of seller categories that are themselves informative, embodiments of seller categorization mapping information within seller categorization mapping database 157 may map particular seller information (e.g., certain item descriptions, SKUs, UPCs, shipping services selections, customs form information, etc.) indicative of jewelry sales to a "jewelry" category. Continuing with this example, embodiments of seller categorization mapping information within seller categorization mapping database 157 may map particular seller information (e.g., certain item descriptions, SKUs, UPCs, item sizes, acquirer names, customs form information, etc.) indicative of acquirer gender for the shipping information determined to be indicative of the jewelry category to an appropriate gender subcategory, such as "men's jewelry" or "women's jewelry". In a corresponding example of seller categories that are not themselves informative, seller categorization mapping information within seller categorization mapping database 157 of embodiments may map the foregoing particular seller information indicative of jewelry sales to a unique category identifier, such as "Cat0001" designated for jewelry, and the particular seller information indicative of acquirer gender for the shipping information determined to be indicative of jewelry to an appropriate unique subcategory, such as "SubCat0001-A" designated for men's jewelry or "SubCat0001-B" designated for women's jewelry. In another example of seller categories that are themselves informative, embodiments of seller categorization mapping information within seller categorization mapping database 157 may map particular seller information (e.g., certain item descriptions, SKUs, UPCs, customs form information, etc.) indicative of clothing sales to an "apparel" category. Continuing with this example, embodiments of seller categorization mapping information within seller categorization mapping database 157 may map particular seller information (e.g., certain item descriptions, SKUs, UPCs, item sizes, etc.) indicative of user age for the shipping information determined to be indicative of the apparel category to an appropriate age subcategory, such as "children's apparel", "junior's apparel", or "adult's apparel". In a corresponding example of seller categories that are not themselves informative, seller categorization mapping information within seller categorization mapping database 157 of embodiments may map the foregoing particular seller information indicative of apparel sales to a unique category identifier, such as "Cat0002" designated for apparel, and the particular seller information indicative of user age for the shipping information determined to be indicative of apparel to an appropriate unique subcategory, such as "SubCat0002-A" designated for children's apparel, "SubCat0002-B" designated for junior's apparel", or "SubCat0002-C" designated for adult's apparel.

As can be appreciated from the foregoing, both the categories and subcategories that are and are not themselves informative of the particular seller categories/subcategories represented facilitate relevant grouping of sellers based upon seller information.

It should be appreciated that the foregoing seller categories and subcategories are merely exemplary of the type of seller categorization that may be employed for grouping sellers for associating various features and options therewith to optimize functionality, options, interfaces, operations, workflows, etc. of the shipping management system for sellers in accordance with the concepts herein. For example, the seller categories used are not limited to the specific type or number categories provided in the examples above. Seller categories may, for example, include relatively broad categories such as apparel, athletic equipment, electronics, phone accessories, automotive parts, insurance, food, beverages, pharmaceuticals, software, etc., and/or more narrow categories such as formal wear, sportswear, swimming equipment, soccer equipment, audio equipment, televisions, phone cases, phone chargers, automotive drivetrain parts, automotive electronics, homeowner insurance, health insurance, produce, dry goods, soft drinks, alcoholic beverages, homeopathic medicine, over-the-counter allergy medications, gaming software, productivity software, etc. Similarly, sub-categorization provided according to embodiments may be other than the one subcategory level of the above examples. For example, embodiments of the seller categorization mapping information may not include any subcategories. Alternatively, embodiments of the seller categorization mapping information may include further subcategorization (e.g., the above example apparel category and age subcategory may have further subcategory levels based upon gender, season, casual/dress, etc.).

Seller categories and subcategories of embodiments of the invention are not limited to categories and subcategories reflective of the particular items sold or offered for sale by sellers, but additionally or alternatively may include seller categorization information other forms of information facilitating relevant grouping of sellers. For example, where a seller participates in one or more marketplace having certain seller requirements or attributes (e.g., a marketplace such as the PRIME portion of the Amazon marketplace providing for two day delivery of items), such information may form the basis of a seller category and/or subcategory (e.g., "2 day shipment" subcategory) for which fulfillment management feature sets may be tailored to the sellers.

In addition to being configured for inferentially determining one or more categories and/or subcategories for sellers using information, a rules based engine of feature set optimization engine 151 of embodiments may further be configured for intelligently applying inferentially determined seller categorization information to tailor a fulfillment management feature set of shipping management system 150 for sellers. Accordingly, feature set optimization engine 151 may perform processing for confirming putative seller categories and/or subcategories, such as to determine if the intermediate or putative seller categorization information is to be used as the final or determined seller categorization information, prior to their use in tailoring fulfilment management services to the seller for a particular seller category and/or subcategory. In operation according to embodiments, feature set optimization engine 151 applies various rules to analyze peripheral information (e.g., information that is available to the shipping management system other than that used in determining the putative seller categorization information), to determine a level of confidence with respect to inferentially determined seller categorization information prior to its application in tailoring fulfilment management services for the seller. For example, where seller information such as certain item descriptions, SKUs, UPCs, and/or customs form information is used in determining a putative "apparel" seller category, peripheral information such as marketplaces used for the sale, shipment package size and weight, acquirer name, and/or shipping origination locations may be analyzed in association with a putative seller category/subcategory to determine a level of confidence in the category and/or subcategory determination. In some embodiments, rules may be implemented whereby categorization information for various peripheral information is compared to the putative seller category and/or subcategory for determining if the putative category and/or subcategory is consistent with that of the peripheral information.

A rules based engine of feature set optimization engine 151 of embodiments may be configured for applying inferentially determined seller categorization information (e.g., the seller categories and/or subcategories confirmed as meeting a threshold level of confidence) with respect to one or more features of the shipping management system to tailor a fulfillment management feature set of shipping management system 150 for sellers. For example, various rules may be used by feature set optimization engine 151 to determine the particular functionality, options, interfaces, operations, workflows, etc. of shipping management system 150 (e.g., a fulfillment management feature set) to implement with respect to a seller. Such rules may correlate particular ones of the available functionality, options, interfaces, operations, workflows, etc. with particular categories and subcategories, whereby at least some portion of a fulfillment management feature set implemented for the seller by shipping management system 150 is selected based upon the seller categorization information determined for the seller. A fulfillment management feature set for each such seller may be stored in fulfillment management feature set database 158 of memory 155, such as may include fulfillment management feature set 158a associated with seller 110, fulfillment management feature set 158b associated with another seller (not shown), fulfillment management feature set 158c associated with yet another seller (also not shown), and so on. The fulfillment management feature sets of fulfillment management feature set database 158 are optimized or otherwise tailored to the respective seller in accordance with the seller categorization information determined for that seller.

Having provisioned a fulfillment management feature set that is tailored to the seller, embodiments of shipping management system 150 operate to utilize the fulfillment management feature set for configuring various functionality, options, interfaces, operations, workflows, etc. thereof appropriate to the seller's use of the shipping management system. For example, a user interface of the shipping management system or a client application used by seller 110 may be configured in accordance with fulfillment management feature set 158a corresponding to that seller. Likewise, one or more features of shipping management system 150 may be made available to seller 110 in accordance with fulfillment management feature set 158a corresponding to that seller. As a further example, one or more defaults, selections, etc. may be preselected in shipping management system 150 in accordance with fulfillment management feature set 158a corresponding to that seller. As a still further example, one or more offering or recommendation may be made to seller 110 in accordance with fulfillment management feature set 158a corresponding to that seller.

It should be appreciated that a fulfillment management feature set of fulfillment management feature set database 158 corresponding to a particular seller may be used by shipping management system 150 for all interaction with the shipping management system by that seller or only with respect to some portion thereof. For example, a first fulfillment management feature set (e.g., fulfillment management feature set 158a) corresponding to seller 110 may be utilized by shipping management system 150 with respect to transactions for seller 110 involving items of a respective first category and/or subcategory, whereas a second fulfillment management feature set (e.g., fulfillment management feature set 158b) corresponding to seller 110 may be utilized by shipping management system 150 with respect to transactions for seller 110 involving items of a respective second category and/or subcategory. As may be appreciated from the foregoing, more than one fulfillment management feature set may be provided with respect to any particular seller according to embodiments of the invention. The particular fulfillment management feature set utilized with respect to such a seller at any particular time may be selected various ways, such as based upon a majority or weighting of items being processed or managed by the system corresponding to a particular fulfillment management feature set, a particular marketplace through which a majority or weighting of items being processed or managed by the system were sold corresponding to a particular fulfillment management feature set, selection of a particular fulfillment management feature set by the seller, etc.

Having generally described a feature set optimization engine as may be implemented in accordance with the concepts herein, embodiments of a feature set optimization engine implementing a rules based engine for analyzing various seller information and determining seller categorization information are described in further detail below. As can be appreciated from the foregoing, the rules utilized by a feature set optimization engine of embodiments of the invention may include rules for determining seller categorization information, rules for determining a level of confidence with respect to determined seller categorization information, and rules for applying determined seller categorization information in configuring features and options of a shipping management system. Accordingly, feature set optimization engine 151 of FIG. 1 is shown as including a rules based engine comprising seller categorization determination rules engine 152, categorization confidence determination rules engine 153, and feature set optimization implementation rules engine 154. Seller categorization determination rules engine 152, categorization confidence determination rules engine 153, and feature set optimization implementation rules engine 154 cooperate to provide operation for analyzing various information associated with a seller to determine seller categorization information and to intelligently apply the determined seller categorization information with respect to one or more features of shipping management system 150 to implement a fulfillment management feature set tailored to the user. The fulfillment management feature set may, for example, control available functionality, options, interfaces, operations, workflows, etc. of the shipping management system to optimize or otherwise configure shipping management system 150 setup and/or operation for the seller's operation and use.

Figure 2:
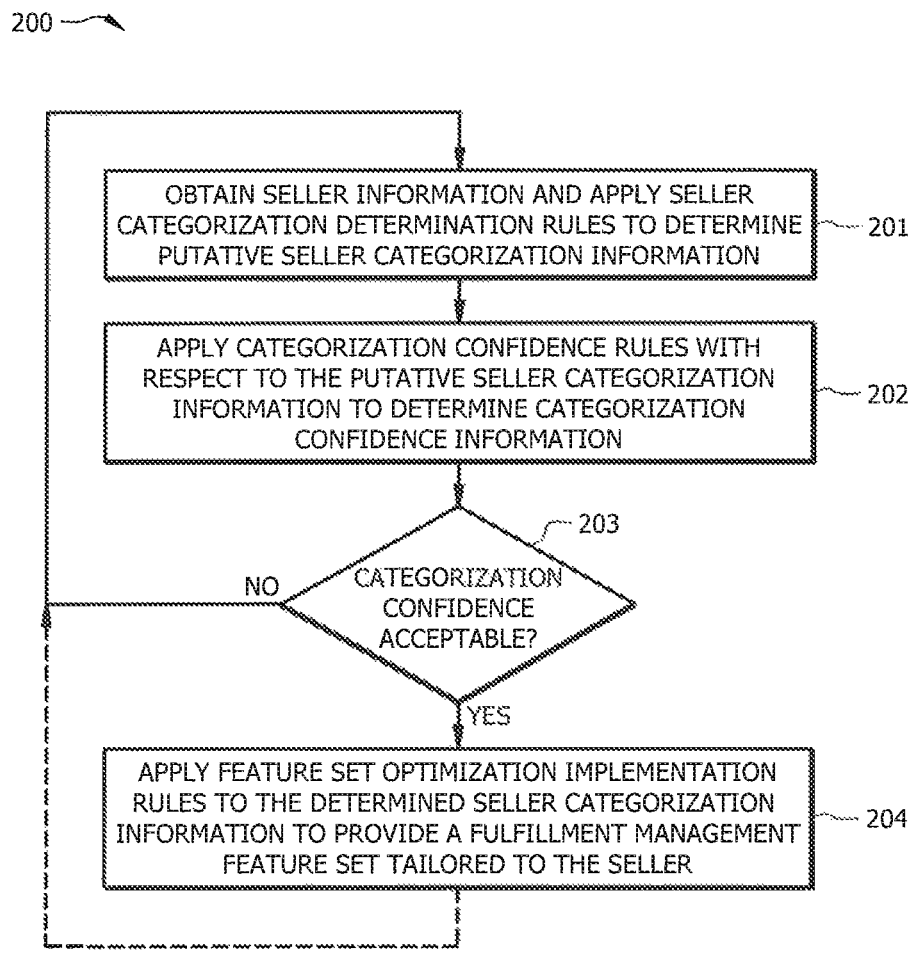
FIG. 2 shows a high level flow diagram of operation of a rules based engine providing determination of seller categorization information and providing a fulfillment management feature set tailored to the seller based upon the seller categorization information in accordance with embodiments of the present invention.

FIG. 2 shows an example flow diagram of operation of seller categorization determination rules engine 152, categorization confidence determination rules engine 153, and feature set optimization implementation rules engine 154 of embodiments of feature set optimization engine 151 in accordance with embodiments of the invention. In particular, flow 200 of FIG. 2 illustrates operation of seller categorization determination rules engine 152, categorization confidence determination rules engine 153, and feature set optimization implementation rules engine 154 configured to provide for analyzing seller information to determine seller categorization information and to intelligently apply the determined seller categorization information with respect to one or more features of shipping management system 150 to implement a fulfillment management feature set tailored to the user.

At block 201 of the illustrated embodiment of flow 200, seller categorization determination rules engine 152 obtains seller information with respect to a particular seller for which one or more fulfillment management feature sets are to be tailored (e.g., seller 110), and applies seller categorization determination rules to some or all of the seller information to determine intermediate or putative seller categorization information for that seller. The seller information may comprise various information associated with the seller's sales operations, items offered for sale and/or sold, the seller's use of an associated system (e.g., shipping management system 150) and/or use of services thereof, the seller's affiliation with and/or use of marketplaces (e.g., marketplaces corresponding to marketplace systems 130a-130b), and/or any other information indicative of a correspondence between the seller and a group of other sellers for which fulfillment management features may be similarly selected and configured to optimize or otherwise configure the shipping management system setup and/or operation for the seller's use. Seller information of embodiments may, for example, comprise descriptions of items (e.g., textual description, SKU identification code, UPC information, item identification number, item size, item weight, etc.), inventory information (e.g., quantity, location, etc.), shipping media information (e.g., postage indicia generation information, shipping label generation information, shipping box and container sizes, packing materials used, packing list information, duty and/or tariff form information, etc. of shipping media 113), shipping service information (e.g., shipping service providers such as the USPS, UPS, FedEx, DHL, local couriers, etc. and/or shipping services such as first class mail, overnight delivery, two-day delivery, return receipt requested, signature required, insured parcel, etc. used by the seller, shipping rates, etc.), and/or the like. Accordingly, seller categorization determination rules engine 152 of embodiments enables feature set optimization engine 151 to apply seller categorization determination rules to such seller information obtained with respect to a particular seller to determine putative seller categorization information for that seller.

In operation according to embodiments, feature set optimization engine 151 may collect some or all such seller information from shipping management system 150, such as during an initial setup process with respect to the seller and/or throughout the seller's use of shipping management system 150. Additionally or alternatively, feature set optimization engine 151 may collect some portion of such seller information from external systems, such as seller system 111, acquirer system 120, and/or marketplace systems 130a-130b. Regardless of when or how feature set optimization engine 151 collects seller information, the collected information may be stored in a memory (e.g., seller information database 156 stored in memory 155) for use in determining putative seller categorization information in accordance with embodiments herein. Seller categorization determination rules engine 152 of embodiments may thus operate to obtain relevant seller information from seller information database 156 (e.g., seller information 156a associated with seller 110).

Seller categorization information determined according to embodiments of the invention comprises seller industry, seller product category, and/or any other information useful for grouping sellers for which fulfillment management features may be similarly selected and configured to optimize or otherwise configure the shipping management system setup and/or operation for the seller's use. Accordingly, seller categorization information of embodiments may comprise one or more seller category and/or subcategory for the seller.

Seller categorization determination rules engine 152 of embodiments applies seller categorization determination rules to at least some portion of the aforementioned seller information for a particular seller to determine putative seller categorization information. Rules for determining seller categorization information utilized by seller categorization determination rules engine 152 of embodiments may comprise rules to determine instances of particular seller information indicative of respective seller categorization information. As an example of a rule to determine instances of particular seller information indicative of respective seller categorization information, a seller categorization determination rule may establish that detection of certain item description information (e.g., "necklace", "watch", "bracelet", "ring", "broach", "cufflinks", etc.) within the seller information (e.g., within inventory information, item sales listings, item orders, etc.) suggests that the seller is associated with a particular category (e.g., "jewelry") and/or subcategory (e.g., "women's jewelry" or "men's jewelry") of seller categorization information. Embodiments may include rules that not only consider individual words, phrases, or other data points, but additionally or alternatively operate to use logic to cluster various words, phrases, and/or other data points (e.g., successive words/data points, words/data points appearing within some relational "distance" of one another, etc.) to determine instances of particular seller information indicative of respective seller categorization information. Rules for determining seller categorization information may determine the number of transactions that a particular seller performs with respect to items of any of the identified categories and/or subcategories and compare that indication of frequency with similar frequency information for sellers of a corresponding category and/or subcategory (e.g., aggregated item transaction frequency information for the sellers of a category/subcategory) for determining putative seller categorization information. Additionally or alternatively, rules for determining seller categorization information may determine repetition patterns with respect to transactions that a particular seller performs with respect to their customers (e.g., customers reorder the same item or items repeatedly) in determining putative seller categorization information (e.g., customers reordering the same items periodically, such as every month or every quarter, may suggest a "pharmacy" category, customers reordering the same items frequently may suggest a "grocery store" category, etc.).

Although the foregoing provides examples of identifying suggestions of seller categorization information from a single type of seller information (e.g., item description), embodiments operate to obtain suggestions of seller categorization information from a plurality of types of seller information (e.g., two or more of item description information, product/inventory information, shipping media information, shipping service information, sales history information, market place information, customer information, supplier information, and seasonality information) for a robust determination of seller categorization information. For example, embodiments of seller categorization determination rules engine 152 of may implement TFIDF analysis techniques for clustering sellers having a similarities (e.g., similar sets of common identified terms with respect to any or all of item description information, product/inventory information, shipping media information, shipping service information, sales history information, market place information, customer information, supplier information, and seasonality information) in determining putative seller categorization information.

Seller categorization determination rules engine 152 preferably implements a multi-layered rule set for determining seller categorization information in light of the seller categorization information being inferentially determined from seller information that is not directly seller industry or product category information but which is otherwise utilized and available for shipping management functionality of a shipping management system. Accordingly, rules for determining seller categorization information utilized by seller categorization determination rules engine 152 of embodiments may comprise a second layer of rules to select particular seller categorization information for the seller from a plurality of categories and/or subcategories suggested by application of a first layer of rules. As an example of a rule to select particular seller categorization information from a plurality of categories and/or subcategories, a seller categorization determination rule may apply one or more analytical process (e.g., summing algorithm, averaging algorithm, weighting algorithm, correlation algorithm, etc.) to the suggested seller categorization information to select particular seller categorization information therefrom. For example, an embodiment may utilize a summing and/or averaging algorithm to select seller categorization information (e.g., a seller category and/or subcategory) having a largest number of corresponding instances in the seller information and/or having sharing greatest commonality with respect to other sellers categorized in a particular seller category and/or subcategory.

It should be appreciated that all instances of correspondence between particular seller information and seller categorization information may not be equal, and thus analytical processes, such as weighting, may be additionally or alternatively utilized in a multi-layered rule set for determining seller categorization information of embodiments. For example, an embodiment may utilize a weighting algorithm to provide greater emphasis on particular instances of correspondence between particular seller information and seller categorization information. As an example, seller categorization information suggested by seller information having a higher correlation to seller categorization information (e.g., UPC information may uniformly identify items and thus the correspondence of certain items identified by UPC to particular seller categorization information may be highly reliable) may be weighted greater in selecting particular seller categorization information from suggested seller categorization information than seller categorization information suggested by seller information having a lower correlation to seller categorization information (e.g., item description information may include ambiguous terms such as "ring" denoting a piece of jewelry or alternatively a car accessory for holding keys). As another example, seller categorization information suggested by seller information of a type more strongly correlated to seller categorization information (e.g., item description information) may be weighted greater in selecting particular seller categorization information from suggested seller categorization information than seller categorization information suggested by seller information of a type less strongly correlated to seller categorization information (e.g., shipping media information). As yet another example, seller categorization information suggested by seller information regarding numbers of particular items handled by the seller (e.g., inventory information showing quantity on hand, sales records showing numbers of items sold, etc.) may be used in weighting particular seller categorization information from suggested seller categorization information. As a further example, seller information may show seasonality with respect to one or more aspects thereof (e.g., particular items sold seasonally, seller is active or more active in particular seasons, particular shipping services are used or used more seasonally, etc.) whereby such seller information may be weighted more or less for indicating seller categorization information for a seller (e.g., selling food products primarily in the Christmas, Mother's Day, and Valentine's Day seasons may strongly suggest a "gift basket retailer" subcategory and thus be weighted accordingly, selling flowers primarily in the spring and summer seasons without a similar increase in flower sales in the Mother's Day and Valentine's Day seasons may suggest a "home and garden" category rather than a "florist" category and thus be weighted accordingly, etc.).

As can be appreciated from the foregoing, application of seller categorization determination rules to seller information for a particular seller by embodiments of seller categorization determination rules engine 152 operates to correlate various information associated with a seller with that of other sellers and/or category/subcategory designations to determine putative seller categorization information for that seller. In order to facilitate such correlation of certain seller information (e.g., seller information that is somewhat variable, such as textual item descriptions), embodiments of seller categorization determination rules engine 152 may apply seller information mapping information (e.g., as may be included as a part of seller categorization mapping database 157) to map a plurality of differing instances of seller information (e.g., synonymous, equal, related, etc.) to a homogenous instance of seller information representing each such differing instance. For example, instances of "shirt", "tunic", "blouse", etc. in the seller information may all be mapped to "shirt" for applying seller categorization determination rules by seller categorization determination rules engine 152 to determine putative seller categorization information for a seller. Accordingly, seller information mapping information of embodiments may include one or more tables providing mapping between various differing instances of seller information to corresponding representative homogeneous instances of seller information. Such seller information mapping information may be initially provided by an administrator or other personnel associated with shipping management system 150, such as at a time of deployment and/or throughout operation of the system. Additionally or alternatively, such seller information mapping information may be derived by logic of shipping management system 150, such as by analyzing seller information of various sellers and associating differing instances of the seller information (e.g., using the aforementioned seller clustering technique). As a further example, such seller information mapping information may be derived by logic of shipping management system 150, such as by analyzing items that are commonly bundled together or often appear in a single order.

Referring again to flow 200 of FIG. 2, after seller categorization determination rules engine 152 obtains seller information for a particular seller and applies seller categorization determination rules to determine putative seller categorization information for that seller at block 201, processing according to the illustrated embodiment proceeds to block 202 for determining a level of confidence with respect to the putative seller categorization information. Accordingly, at block 202 of the illustrated embodiment, categorization confidence determination rules engine 153 applies categorization confidence rules to putative seller categorization information provided by seller categorization determination rules engine 152 to determine categorization confidence information for intelligently apply seller categorization information with respect to one or more features of shipping management system 150. Accordingly, categorization confidence determination rules engine 153 may perform processing for confirming putative seller categories and/or subcategories prior to their use in tailoring fulfilment management services to the seller for a particular seller category and/or subcategory.

In operation of categorization confidence determination rules engine 153 of embodiments various information (referred to as peripheral information) that is not otherwise used in determining putative categorization information (e.g., information that is less strongly correlated to seller categories, information that is external to shipping management system 150, information that is related to the seller but not directly related to particular items from which seller information used in determining putative categorization information was determined, etc.) is used to determine a level of confidence with respect to putative seller categorization information prior to its application in tailoring fulfilment management services for the seller. For example, categorization confidence determination rules engine 153 may use various rules to analyze peripheral information to determine one or more level of confidence metrics for the putative seller categorization information. As an example of rules for determining level of confidence metrics with respect to putative seller categorization information, putative seller categorization information for a seller is compared with seller categorization information known to correspond to a plurality of instances of particular peripheral information corresponding to the seller, wherein a metric may be determined from application of one or more analytical process (e.g., summing algorithm, averaging algorithm, weighting algorithm, correlation algorithm, etc.) to the number of "hits" and/or "misses". As a specific example, a putative seller category determined to be "apparel" may be compared to both the known seller categories supported by a marketplace used by the seller and the known seller categories accommodated by the shipping media used by the seller, the instances of the putative seller category matching the known seller categories for this peripheral information summing to provide level of confidence metric for the putative seller categorization information. As another example of rules for determining level of confidence metrics with respect to putative seller categorization information, interactions may be performed with respect to a seller to test the veracity of putative seller categorization information for a seller (e.g., a seller may be offered services or features useful to or otherwise consistent with a putative seller categorization, wherein the seller's acceptance/rejection of the offers, resulting improvement/degradation in the performance of the system with respect to the seller's subsequent use, etc. may be analyzed for determining level of confidence metrics).

Having determined level of confidence information with respect to putative seller categorization information at block 202, the embodiment of flow 200 illustrated in FIG. 2 proceeds to block 203 for a determination as to whether the level of confidence with respect to the putative seller categorization information is acceptable for tailoring a fulfillment management feature set for the seller based upon the determined seller categorization information. That is, processing at block 203 of embodiments may determine if the intermediate or putative seller categorization information is to be used as the final or determined seller categorization information for tailoring a feature set of the shipping management system to the seller. Accordingly, operation at block 203 by categorization confidence determination rules engine 153 of embodiments may apply one or more rules with respect to a categorization confidence metric determined for putative seller categorization information for determining whether to tailor a fulfillment management feature set for the seller using putative seller categorization information, or to return to processing for determining (e.g., refining) putative seller categorization information. For example, categorization confidence determination rules engine 153 may compare the level of confidence metric with a confidence threshold value to determine if the level of confidence with respect to the putative seller categorization information is sufficiently high so as to indicate that the putative seller categorization information is acceptable for use in determining a fulfillment management feature set to be utilized by the shipping management system for the seller. As an example of categorization confidence acceptability rules implemented by categorization confidence determination rules engine 153, particular threshold values may be selected with respect to each of a plurality of possible seller categories and/or subcategories, wherein if a categorization confidence metric for a putative seller category and/or subcategory meets or exceeds its respective threshold it may be determined to be acceptable. It should be appreciated that the threshold values for different ones of the possible categories and subcategories may be different, whereby the categorization confidence acceptability rules may provide a determination that one putative seller category/subcategory of the putative seller categorization information is acceptable (e.g., a more common seller category, a more broad seller category, etc.) while another putative seller category/subcategory of the putative seller categorization information (e.g., a less common seller category, a less broad seller category, etc.) may be determined not to be acceptable despite their each having a same categorization confidence metric (although having different confidence acceptability thresholds).

In operation according to the illustrated embodiment of flow 200, if it is determined that a confidence level with respect to the putative seller categorization information is not acceptable, processing returns to block 201 wherein seller categorization determination rules engine 152 may obtain further (e.g., additional, updated, etc.) seller information with respect to the particular seller and again apply seller categorization determination rules to some or all of the seller information to determine or refine putative seller categorization information for that seller. However, if it is determined that a confidence level with respect to the putative seller categorization information is acceptable, processing according to the illustrated embodiment proceeds to block 204 wherein a fulfillment management feature set tailored for the seller based upon the determined seller categorization information is provided. Accordingly, feature set optimization implementation rules engine 154 of embodiments provides a rules based engine for implementing a fulfillment management feature set optimized or otherwise tailored to the seller in accordance with the seller categorization information determined with respect to the seller. For example, in operation according to embodiments of the invention, feature set optimization implementation rules engine 154 may apply the determined seller categorization information (e.g., the seller categories and/or subcategories confirmed as meeting a threshold level of confidence) with respect to one or more features of shipping management system 150 to provide a fulfillment management feature set tailored for the seller.

It should be appreciated that, whether or not it is determined that a confidence level with respect to the putative seller categorization information is acceptable, seller categorization determination rules engine 152 of embodiments may dynamically determine putative seller categorization information (e.g., periodically repeating operation according to blocks 201-203), such as nightly, weekly, etc. For example, as shipping management system 150 obtains data regarding the sellers corresponding to particular categories and/or subcategories, the correspondence between particular seller information and seller categorization information may be altered. Accordingly, determinations regarding seller categorization information may differ in subsequent iterations and thus seller categorization and/or subcategorization may be changed, level, of confidence metrics determined with respect to putative seller categorizations and/or subcategorizations may be changed, etc.

Various rules may be used by feature set optimization implementation rules engine 154 to determine the particular functionality, options, interfaces, operations, workflows, etc. of shipping management system 150 (e.g., a fulfillment management feature set) to implement with respect to the seller. For example, feature set determination rules applied by feature set optimization implementation rules engine 154 may correlate particular ones of the available functionality, options, interfaces, operations, workflows, etc. with particular categories and subcategories, whereby at least some portion of a fulfillment management feature set implemented for the seller by shipping management system 150 is selected based upon the seller categorization information determined for the seller. In order to facilitate determining correlation between certain seller categorization information (e.g., particular categories and/or subcategories) and corresponding functionality, options, interfaces, operations, workflows, etc., embodiments of feature set optimization implementation rules engine 154 may apply feature set determination rules comprising feature mapping information (e.g., as may be included as a part of seller categorization mapping database 157) to map seller categorization information to different relevant functionality, options, interfaces, operations, workflows, etc. of shipping management system 150. Such correlations between seller categorization information and particular functionality, options, interfaces, operations, workflows, etc. of shipping management system 150 may be initially provided by an administrator or other personnel associated with shipping management system 150, such as at a time of deployment and/or throughout operation of the system. Additionally or alternatively, seller categorization information mapping to particular functionality, options, interfaces, operations, workflows, etc. of shipping management system 150 may be derived by logic of shipping management system 150, such as by analyzing the particular functionality, options, interfaces, operations, workflows, etc. utilized, selected, invoked, etc. by other sellers identified as being associated with particular seller categorization information.

Feature set determination rules utilized according to embodiments herein may be dynamically reconfigured (e.g., the correlation between particular ones of the available functionality, options, interfaces, operations, workflows, etc. and particular categories and subcategories revised), such as nightly, weekly, etc. For example, as shipping management system 150 obtains data regarding the sellers identified with particular categories and/or subcategories use/non-use of various features, effectiveness of particular features (e.g., shipping cost savings, reduced return rates, reduced fulfillment processing time, etc.) with respect to sellers identified with particular categories and/or subcategories, etc., the particular features of feature sets mapped to particular categories and/or subcategories may be altered.

In operation of feature set optimization implementation rules engine 154 of embodiments, the particular functionality, options, interfaces, operations, workflows, etc. of shipping management system 150 determined to correlate to seller categorization information for a seller are aggregated into a fulfillment management feature set for the seller. Such fulfillment management feature sets may be stored in fulfillment management feature set database 158 as a fulfillment management feature set corresponding to the particular seller (e.g., fulfillment management feature set 158a being associated with seller 110). Accordingly, a fulfillment management feature set may be utilized to select, selectively activate, implement, alter, etc. functionality, options, interfaces, operations, workflows, etc. of the shipping management system based upon the seller categorization information determined for the seller. For example, some or all of a fulfillment management feature set associated with a seller may be utilized by shipping management system 150 to configure, provision, alter, control, etc. a respective aspect of the shipping management system for operation with respect to that seller. Feature sets appropriate to seller categories and/or subcategories may be implemented with respect to the correspondingly categorized sellers to provide improved operation and use of shipping management system 150, such as to result in the use of less expensive but nonetheless appropriate shipping services, implementation or modification of workflows to provide workflows more conducive to the seller's fulfilment activities, automate certain repetitive tasks common to the seller's category and/or subcategory, etc.

Fulfilment management feature sets tailored to the sellers may, for example, be utilized to configure a user interface of shipping management system 150 or of a client application thereof so as to provide a user interface configured in accordance with the seller's activities and use of the shipping management system (e.g., the user interface being configured to include certain optional controls, data, etc., configured in accordance with an efficient layout for repetitive tasks, etc.). Additionally or alternatively, fulfilment management feature sets tailored to the sellers may be utilized to select particular default parameters/settings relevant to the seller's use of the shipping management system (e.g., setting a default to select a shipping insurance option for the seller's shipments where the seller category is determined to be "jewelry", setting a default to select second day delivery for the seller's shipments where the seller category is determined to be "2 day shipment", etc.). As a further example, fulfilment management feature sets tailored to the sellers may additionally or alternatively provide information or make recommendations in association with the seller's use of the shipping management system (e.g., provide a recommended shipping service provider and/or shipping service for fulfillment of orders including items in a determined category and/or subcategory, provide recommended shipping media for fulfillment of orders including items in a determined category and/or subcategory, suggest a type of shipping insurance that should be used for fulfillment of orders, suggest additional items in a category and/or subcategory or additional items in a related category and/or subcategory the seller might consider offering, suggest another marketplace for selling items of a category and/or subcategory, suggest a third party fulfilment provider for particular products offered by the seller to reduce or avoid the need for the seller to stock inventory of particular items, suggest that a seller offer additional items complementary or related to other items offered by the seller using a third party fulfilment provider without the seller having to inventory the additional items, etc.).

It should be appreciated that features configured in accordance with a fulfillment management feature set of embodiments herein may not be positive configurations, but may additionally or alternatively include negative configurations. For example, one or more feature or option of shipping management system 150 may be suppressed or otherwise made unavailable from application of a fulfillment management feature set tailored to a particular seller (e.g., an option to decline shipping insurance for the seller's shipments where the seller category is determined to be "jewelry" may be suppressed). As a further example, information or suggestions not to perform a fulfillment function may be provided to a seller from application of a fulfillment management feature set tailored to a particular seller (e.g., where a seller is fulfilling an order to ship items of a particular category/subcategory into an area determined to be risky, such as due to lost shipments, excessively high item return rates, etc. based upon experiences of other sellers using the shipping management system having seller categorization information in common with the particular seller, a warning regarding the fulfillment transaction may be provided and/or a recommendation regarding an alternative fulfillment transaction may be given). As yet a further example, information or suggestions regarding items not to be sold and/or marketplaces not to be used by a particular seller may be provided to the seller from application of a fulfillment management feature set tailored to that seller (e.g., where other sellers using the shipping management system having seller categorization information in common with the particular seller are experiencing slow sales of the items and/or poor experiences with the marketplace).

Fulfilment management feature sets provided according to embodiments of the invention may be utilized to configure operational aspects or otherwise adapt shipping management system 150 for each particular seller with respect to all the seller's use of the shipping management system, or some portion thereof. For example, once a fulfillment management feature set tailored to the seller is provided according to some embodiments various settings, preferences, etc. may be established and continually applied with respect to the seller's use of shipping management system 150 thereafter. In operation according to some embodiments, aspects of a fulfillment management feature set tailored to a seller may be applied only with respect to the seller's transactions corresponding to seller categorization information (e.g., a category and/or subcategory) to which the fulfillment management feature set relates. Additionally or alternatively, aspects of a fulfillment management feature set tailored to a seller may be applied periodically or aperiodically. For example, shipping management system 150 may utilize aspects of a fulfillment management feature set at various times, such as at a time of setup or maintenance, at a time of a periodic report (e.g., monthly, quarterly, yearly reporting periods), or upon the occurrence of one or more events (e.g., when a change in the level of sales activity, whether increased or decreased, is detected for a seller, when a seller utilizes a particular predetermined function of the shipping management system, etc.), such as to provide various information and/or recommendations (e.g., suggest additional items in a category and/or subcategory or additional items in a related category and/or subcategory the seller might consider offering, suggest another marketplace for selling items of a category and/or subcategory, etc.).

It should be appreciated from the foregoing that not only are sellers able to enjoy shipping management system operation that is optimized for their particular situation, even in situations where a seller is unwilling to devote adequate time to thoroughly completing a robust setup process and/or does not have sufficient information or a clear understanding of the available options to optimize the shipping management system setup for their use, but sellers of embodiments herein are provided with fulfillment management feature sets derived from information not otherwise available to the sellers individually. For example, fulfillment management feature sets provided for use by a particular seller in accordance with embodiments of the invention comprise particular functionality, options, interfaces, operations, workflows, etc. of a shipping management system selected from those invoked or used by other sellers using shipping management system having seller categorization information in common with the particular seller. Similarly, fulfillment management feature sets of embodiments may provide information and/or recommendations to a particular seller based upon the use of a shipping management system by other sellers using shipping management system having seller categorization information in common with the particular seller.

Seller categorization information determination and associated tailoring of a fulfillment management feature set for particular sellers may be performed continually, periodically, and/or aperiodically. For example, the functions of blocks 201-204 of flow 200 shown in FIG. 2 may be initially performed upon the occurrence of an event, such as the seller setting up one or more features of the shipping management system, the seller entering a new marketplace or new seller category, etc. Thereafter, the functions of flow 200 may be performed continually or occasionally to dynamically revise, reconfigure, and/or provide new one or more fulfillment management feature sets relevant to the seller, as illustrated by the dotted line in FIG. 2. Such operation according to embodiments facilitates shipping management system operation that is optimized to the seller's use even where the seller's business transforms over time and/or where applicability of one or more features or options to the seller otherwise changes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A shipping management system for managing at least a portion of order fulfillment processing by a seller using a fulfilment management feature set tailored to the seller, the system comprising:
    a processor; and
    a memory in communication with the processor, wherein the memory stores one or more instruction sets which when executed by the processor provide:
        a seller categorization determination rules engine configured to apply seller categorization determination rules to seller information for the seller and determine putative seller categorization information for the seller;
        a categorization confidence determination rules engine configured to apply categorization confidence rules to the putative seller categorization information of the seller and determine a level of confidence with respect to putative seller categorization information; and
        a feature set optimization implementation rules engine configured to apply feature set determination rules to seller categorization information of the putative seller categorization information that is confirmed as meeting a threshold level of confidence and determine the fulfillment management feature set tailored to the seller, wherein the feature set optimization implementation rules engine applies the fulfillment management feature set to the shipping management system to configure one or more particular function of the shipping management system, tailoring the shipping management system for the seller without requiring the seller to provide at least some information used for determining the one or more particular function, based upon feature set information for other sellers identified as being associated with seller categorization information corresponding to the seller categorization information of the putative seller categorization information that is confirmed as meeting a threshold level of confidence.

2. The shipping management system of claim 1, wherein the seller categorization determination rules correlate various information of the seller information associated with the seller with that of category designations corresponding to feature settings aggregated from other sellers using the shipping management system to determine the putative seller categorization information for the seller.

3. The shipping management system of claim 2, wherein the seller categorization determination rules engine is further configured to map a plurality of differing instances of seller information to a homogenous instance of seller information representing each such differing instance, and wherein the seller categorization determination rules are applied to a homogeneous instance of seller information to determine the putative seller categorization information for the seller.

4. The shipping management system of claim 1, wherein the seller categorization determination rules determine instances of particular seller information indicative of respective seller categorization information.

5. The shipping management system of claim 1, wherein the seller categorization determination rules implement a multi-layered rule set for determining the putative seller categorization information.

6. The shipping management system of claim 5, wherein a first rule layer of the multi-layered rule set comprises seller categorization determination rules that determine suggested seller categorization information from information stored and used by the shipping management system for order fulfillment for the seller, and wherein a second rule layer of the multi-layered rule set comprises one or more analytical process for applying to the suggested seller categorization information to select particular seller categorization information as the putative seller categorization information.

7. The shipping management system of claim 1, wherein the categorization confidence rules determine the level of confidence using peripheral information available to the shipping management system, wherein the peripheral information comprises information other than that used in determining the putative seller categorization information.

8. The shipping management system of claim 7, wherein the categorization confidence rules compare categorization information of the peripheral information to categorization information of the putative seller categorization information to determine if the putative categorization information is consistent with the peripheral information.

9. The shipping management system of claim 1, wherein the feature set determination rules comprise feature mapping information to map the seller categorization information of the putative seller categorization information that is confirmed as meeting a threshold level of confidence to the one or more particular function of the shipping management system configured by the fulfillment management feature set.

10. The shipping management system of claim 9, wherein the one or more particular function of the shipping management system configured by the fulfillment management feature set are aggregated from other sellers using the shipping management system identified as being associated with seller categorization information corresponding to the seller categorization information of the putative seller categorization information that is confirmed as meeting a threshold level of confidence.

11. A method performed by a processor-based system for managing at least a portion of order fulfillment processing by a seller using a fulfilment management feature set of a shipping management system tailored to the seller, the method comprising:
    generating, by the processor-based system, intermediate seller categorization information using a seller categorization determination rules engine configured to apply seller categorization determination rules to seller information for the seller;
    generating, by the processor-based system, final seller categorization information using a categorization confidence determination rules engine configured to apply categorization confidence rules to the intermediate seller categorization information of the seller and determine a level of confidence with respect to intermediate seller categorization information, wherein the final seller categorization information comprises the intermediate seller categorization information that is confirmed as meeting a threshold level of confidence; and
    applying, by the processor-based system, a fulfillment management feature set to the shipping management system to configure one or more particular function of the shipping management system, tailoring the shipping management system for the seller without requiring the seller to provide at least some information used for determining the one or more particular function, based upon feature set information for other sellers identified as being associated with seller categorization information corresponding to the final seller categorization information.

12. The method of claim 11, wherein the fulfillment management feature set applied to configure the shipping management system is determined by a feature set optimization rules engine configured to apply feature set determination rules to the final seller categorization information and determine the fulfillment management feature set.

13. The method of claim 12, wherein the feature set determination rules comprise feature mapping information to map the final seller categorization information to the one or more particular function of the shipping management system configured by the fulfillment management feature set.

14. The method of claim 13, wherein the one or more particular function of the shipping management system configured by the fulfillment management feature set are aggregated from other sellers using the shipping management system identified as being associated with seller categorization information corresponding to the final seller categorization information.

15. The method of claim 11, wherein the seller categorization determination rules correlate various information of the seller information associated with the seller with that of category designations corresponding to feature settings aggregated from other sellers using the shipping management system to generate the intermediate seller categorization information for the seller.

16. The method of claim 15, wherein the seller categorization determination rules engine is further configured to map a plurality of differing instances of seller information to a homogenous instance of seller information representing each such differing instance, and wherein the seller categorization determination rules are applied to a homogeneous instance of seller information to generate the intermediate seller categorization information for the seller.

17. The method of claim 11, wherein the seller categorization determination rules determine instances of particular seller information indicative of respective seller categorization information.

18. The method of claim 11, wherein the seller categorization determination rules implement a multi-layered rule set for generating the intermediate seller categorization information.

19. The method of claim 18, wherein a first rule layer of the multi-layered rule set comprises seller categorization determination rules that generate suggested seller categorization information from information stored and used by the shipping management system for order fulfillment for the seller, and wherein a second rule layer of the multi-layered rule set comprises one or more analytical process for applying to the suggested seller categorization information to select particular seller categorization information as the intermediate seller categorization information.

20. The method of claim 11, wherein the categorization confidence rules determine the level of confidence using peripheral information available to the shipping management system, wherein the peripheral information comprises information other than that used in generating the intermediate seller categorization information.

21. The method of claim 20, wherein the categorization confidence rules compare categorization information of the peripheral information to categorization information of the intermediate seller categorization information to determine if the intermediate categorization information is consistent with the peripheral information.

22. A method, performed by a processor-based system, for managing at least a portion of order fulfillment processing by a seller using a fulfilment management feature set of a shipping management system tailored to the seller, the method comprising:

generating, by the processor-based system, intermediate seller categorization information using a seller categorization determination rules engine configured to apply seller categorization determination rules to seller information for the seller, wherein processing in accordance with the seller categorization determination rules for generating the intermediate seller categorization information comprises:
 generating suggested seller categorization information from information stored and used by the shipping management system for order fulfillment for the seller; and
 applying one or more analytical process to the suggested seller categorization information to select particular seller categorization information of the suggested seller categorization information as the intermediate seller categorization information;

generating, by the processor-based system, final seller categorization information using a categorization confidence determination rules engine configured to apply categorization confidence rules to the intermediate seller categorization information of the seller and determine a level of confidence with respect to intermediate seller categorization information, wherein the final seller categorization information comprises the intermediate seller categorization information that is confirmed as meeting a threshold level of confidence; and applying, by the processor-based system, a fulfillment management feature set to the shipping management system to configure one or more particular function of the shipping management system, tailoring the shipping management system for the seller without requiring the seller to provide at least some information used for determining the one or more particular function, based upon feature set information for other sellers identified as being associated with seller categorization information corresponding to the final seller categorization information.

23. The method of claim 22, wherein the fulfillment management feature set applied to configure the shipping management system is determined by a feature set optimization rules engine configured to apply feature set determination rules to the final seller categorization information and determine the fulfillment management feature set.

24. The method of claim 22, wherein the categorization confidence rules determine the level of confidence using peripheral information available to the shipping management system, wherein the peripheral information comprises information other than that used in generating the intermediate seller categorization information, wherein the categorization confidence rules compare categorization information of the peripheral information to categorization information of the intermediate seller categorization information to determine if the intermediate categorization information is consistent with the peripheral information.

25. The method of claim 22, wherein the one or more particular function of the shipping management system configured by the fulfillment management feature set are aggregated from other sellers using the shipping management system identified as being associated with seller categorization information corresponding to the final seller categorization information.

* * * * *